No. 658,212. Patented Sept. 18, 1900.
J. M. GARRISON.
GROOVING SAW.
(Application filed Apr. 7, 1900.)
(No Model.) 2 Sheets—Sheet 1.
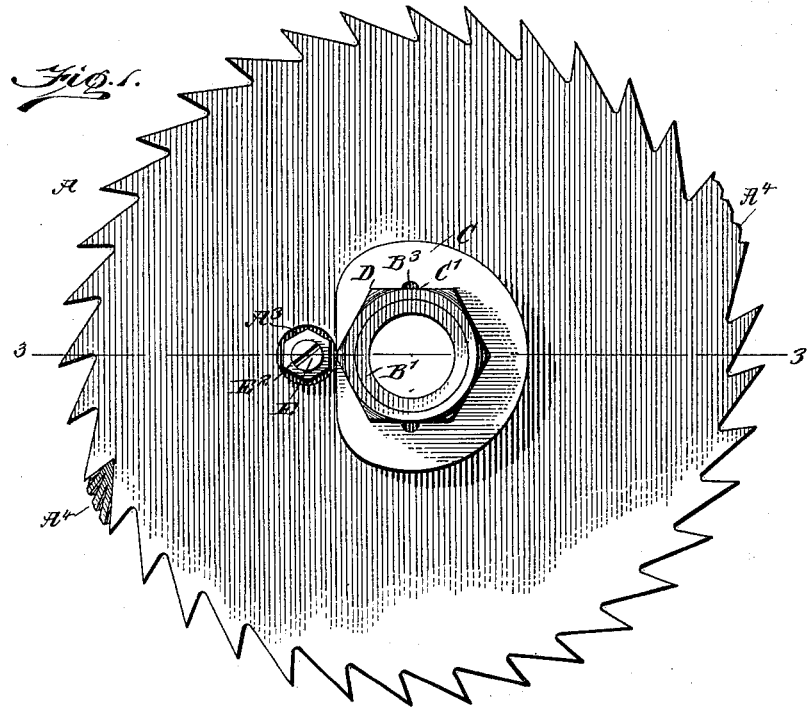
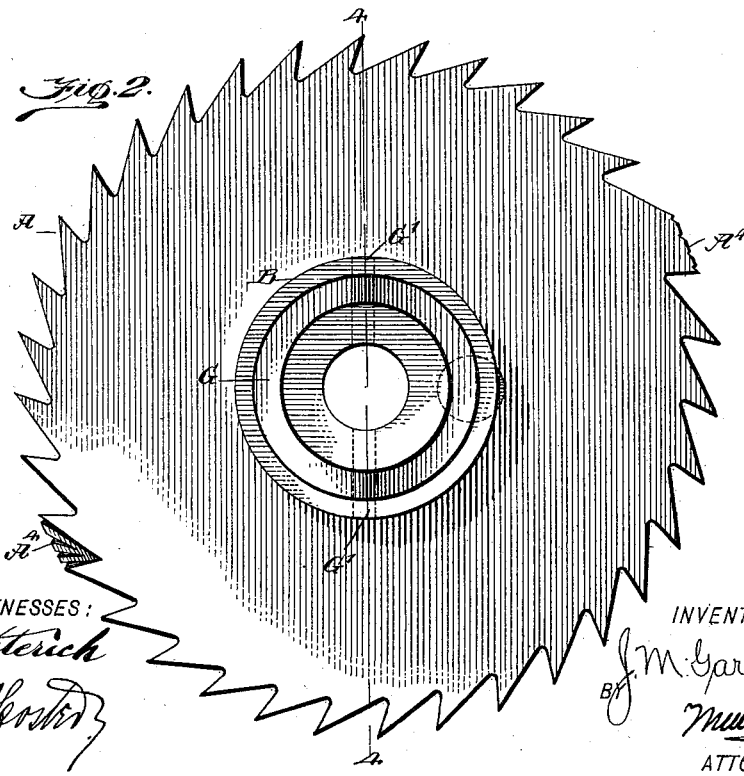
WITNESSES:
INVENTOR
J. M. Garrison
BY
ATTORNEYS No. 658,212. Patented Sept. 18, 1900.
J. M. GARRISON.
GROOVING SAW.
(Application filed Apr. 7, 1900.)
(No Model.) 2 Sheets—Sheet 2.
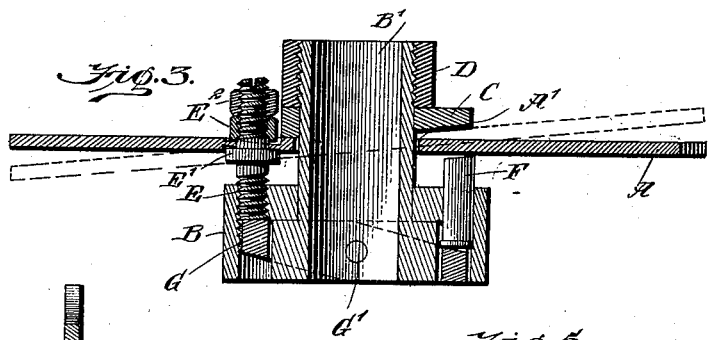
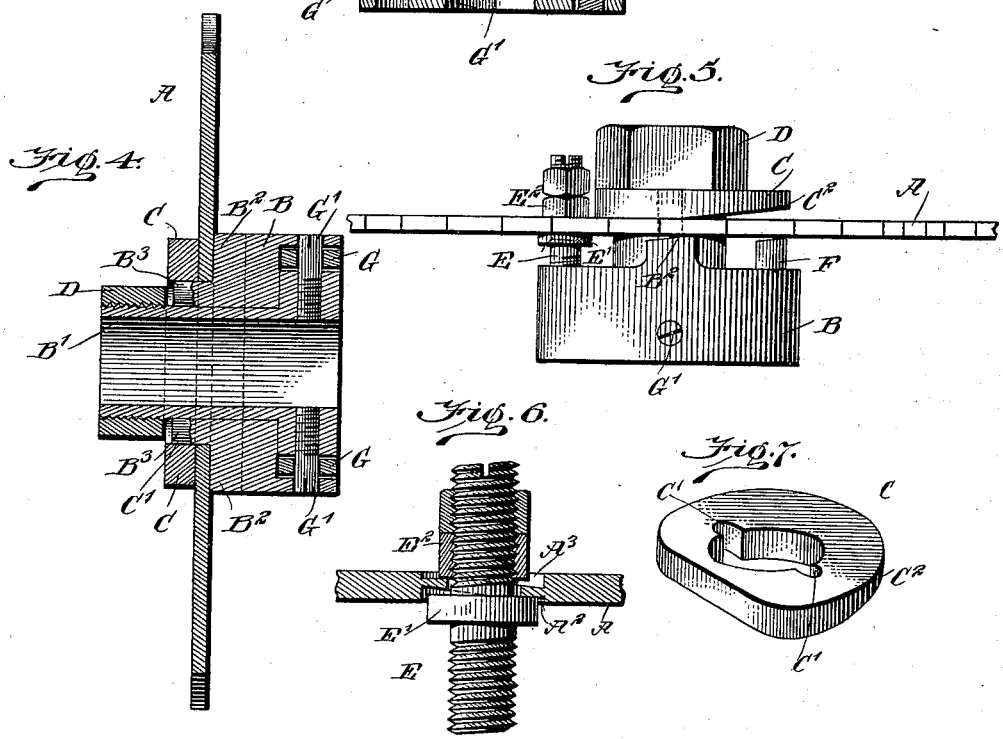
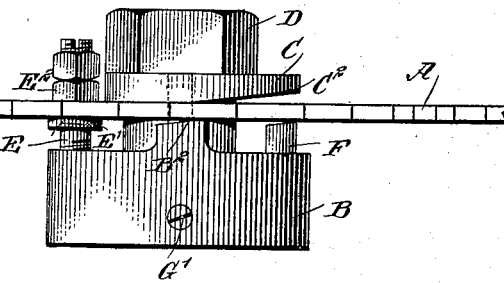
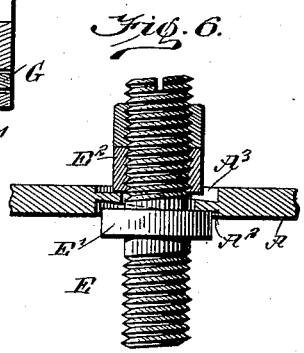
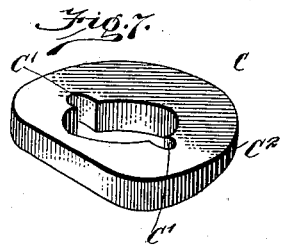
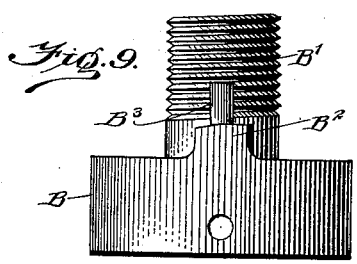
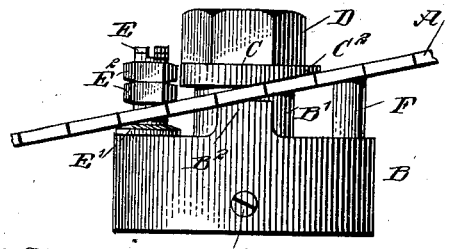
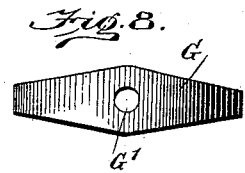
WITNESSES: INVENTOR
J. M. Garrison
ATTORNEYS

UNITED STATES PATENT OFFICE.

JAMES MAY GARRISON, OF SANTA BARBARA, CALIFORNIA.

GROOVING-SAW.

SPECIFICATION forming part of Letters Patent No. 658,212, dated September 18, 1900.

Application filed April 7, 1900. Serial No. 11,964. (No model.)

*To all whom it may concern:*

Be it known that I, JAMES MAY GARRISON, a citizen of the United States, and a resident of Santa Barbara, in the county of Santa Barbara and State of California, have invented a new and Improved Grooving-Saw and Dado-Head, of which the following is a full, clear, and exact description.

The invention relates to woodworking-machines; and its object is to provide a new and improved grooving-saw and dado-head, arranged to allow of conveniently and quickly setting the saw in a right or other angular position relative to the saw-arbor for cutting narrow or wide grooves, the construction of the saw permitting the formation of clean-cut grooves in any kind of wood.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a face view of one side of the improvement. Fig. 2 is a like view of the other side of the same. Fig. 3 is a sectional plan view of the same on the line 3 3 of Fig. 1. Fig. 4 is a transverse section of the same on the line 4 4 of Fig. 2. Fig. 5 is a plan view of the same. Fig. 6 is an enlarged sectional plan view of the adjusting-screw and part of the saw-blade. Fig. 7 is a perspective view of the washer. Fig. 8 is a plan view of the connecting-lever for the adjusting device. Fig. 9 is a plan view of the body of the dado-head, and Fig. 10 is a plan view of the improvement with the saw-blade set in an angular position relative to the axis of the arbor.

The eye A' of the circular saw A fits loosely on the hub B' of the dado-head body B, so that the saw-blade A can assume either a right-angular position or any other angular position relative to the axis of the dado-head and the saw-arbor. One face of the saw-blade A is engaged by a washer C, abutting against a nut D, screwing on the threaded end of the hub B', and the other face of the saw is engaged at diametrically-opposite points by lugs $B^2$, extending from the dado-head body B, as is plainly indicated in Figs. 4 and 5.

At points located at right angles to the lugs $B^2$ are arranged adjusting devices for the saw-blade, the said adjusting devices consisting, as shown, of an adjusting-screw E, screwing in the body B, and a pin F free to slide in the said body, as is plainly indicated in Figs. 3 and 5, the said screw and pin being located diametrically opposite each other to engage the saw-blade at opposite sides and at right angles to the lugs $B^2$ above mentioned. The adjusting-screw E is provided with a collar E' for engaging the face of the blade A opposite to where the washer C is located, and on said adjusting-screw screws the nuts $E^2$, one of which engages the face of the saw-blade at the side on which the washer C is located.

As indicated in Fig. 6, the saw-blade faces are recessed, as at $A^2$ $A^3$, for the reception of the collar E', and the innermost nut $E^2$ and the bottom walls of said recesses are beveled on opposite sides to allow of proper engagement of the collar and nut with the saw-blade when the latter is moved into a tilted or angular position, as indicated in Fig. 10. The faces of the lugs $B^2$ are similarly beveled, as shown in Fig. 5, for a like purpose.

The inner end of the adjusting-screw E abuts against a lever G in the form of a ring fulcrumed at G' on bolts secured to the body B, the said ring-shaped lever being engaged by the inner end of the pin F on the side opposite where the adjusting-screw E engages the said lever. Now it is evident that when the adjusting-screw E is screwed inward, for instance, a swinging motion is given to the lever G, whereby the other side of the lever moves the pin F outward, and this movement corresponds to the inward movement of the adjusting-screw E. It is evident that when this takes place the saw-blade A is moved into an angular position for cutting wider grooves, the width of the grooves corresponding to the amount of tilt given to the saw-blade by adjusting the screw E, as above described.

One portion of the face of the washer C is beveled, as indicated at $C^2$, to insure engagement of the face of the saw-blade by the said washer when adjustment takes place. The washer C is held against turning by pins B³, forming part of the body B and located adjacent to the lugs B², the said pins B³ engaging corresponding slots C', formed in the washer C, as indicated in Fig. 7. It is expressly understood that by having the connection between the adjusting-screw E and the pin F the latter is moved a distance corresponding to the distance the screw E is screwed into or out of the head B, with the difference that the inward movement of the screw causes an outward movement of the pin and an outward movement of the screw causes an inward movement of the pin. From the foregoing it is evident that the mere adjustment of the screw E causes a proper setting of the saw-blade to the desired angle—that is, according to the width of the groove to be cut.

As illustrated in the drawings, the lever G fits loosely in an annular groove formed in the head B, so as to be completely out of the way, and thereby does not form an obstruction to the proper sawing of the wood by the saw-blade A. By the arrangement described the saw-blade A, whether in a right-angular or other angular position, is always engaged at four points on one face, so as to insure a proper holding of the saw-blade on the dado-head to insure correct cutting by the saw-blade.

In order to produce very clean cuts in wood of any kind, I prefer to provide pairs of oppositely-arranged teeth with a web A⁴, having a sharp cutting edge slightly toothed, as indicated in Figs. 1 and 2, with the cutting edge of one web in alinement with one face of the saw-blade and that of the other web in alinement with the other face of the saw-blade. The cutting edges of the said webs also extend slightly beyond the point of the saw-teeth, so that the side walls of the groove cut into the wood are trimmed very accurately, thereby insuring a very clean cut in the wood.

Having thus described my invention, I claim as new and desire to secure by Letters Patent—

1. A dado-head, comprising a body having a hub forming a bearing for the saw-blade and adjusting devices for engaging the saw-blade at opposite sides of its center, and a connection between the adjusting devices, so arranged that when one of the devices is adjusted, the said connection is automatically moved and correspondingly adjusts the other device, substantially as shown and described.

2. A dado-head, comprising a body having a hub forming a bearing for the saw-blade, the said dado-head having oppositely-located supports for one face of the saw-blade, a washer for engaging the opposite face, adjusting devices for engaging the saw at opposite sides of the head-supporting devices, and a connection between the said adjusting devices, so arranged that when one of the devices is adjusted the other connection is moved and correspondingly adjusts the other device, substantially as shown and described.

3. A dado-head, having an adjusting-screw and a pin for engagement with the saw-blade on opposite sides of its center, and a lever fulcrumed on the head and engaged by the said screw and the said pin, the lever being so arranged that the adjustment of the said adjusting-screw causes a corresponding adjustment of the pin but in an opposite direction, substantially as shown and described.

4. A dado-head, comprising a body for attachment to the saw-arbor, lugs carried by the body for engagement with one face of the saw-blade, a washer carried by the said head for engagement with the other face of the saw-blade, the said washer being beveled at one side, and adjusting devices for holding the saw-blade in position at right angles or other angles relatively to the axis of the dado-head, the said devices comprising an adjusting-screw screwing in the head, a pin sliding in the head, and a lever fulcrumed on the head and engaged at opposite sides by the said screw and the said pin, substantially as shown and described.

5. A dado-head, comprising a body for attachment to the saw-arbor, lugs carried by the body for engagement with one face of the saw-blade, a washer carried by the said head for engagement with the other face of the saw-blade, the said washer being beveled at one side, and adjusting devices for holding the saw-blade in position at right angles or other angles relatively to the axis of the dado-head, the said devices comprising an adjusting-screw screwing in the head, a pin sliding in the head, and a lever fulcrumed on the head and engaged at opposite sides by the said screw and the said pin, the said adjusting-screw having a collar and adjusting-nuts, as set forth.

6. A saw-blade, provided with recesses in its faces, and clamping mechanism engaging said recesses to hold the saw-blade in position, the bottoms of the recesses being beveled to allow of proper engagement of the clamping mechanism with the saw-blade when the latter is moved into a tilted or angular position, substantially as shown and described.

7. A saw-blade, having a central eye, an aperture at one side of the eye for the passage of an adjusting-screw, and concentric recesses in the faces of the blade, at the said aperture, the recesses having their bottoms beveled for engagement by parts of the said screw, substantially as shown and described.

In testimony whereof I have signed my name to this specification in the presence of two subscribing witnesses.

JAMES MAY GARRISON.

Witnesses:
ALPHONSE CRANE,
WM. G. GRIFFITH.